United States Patent
Heath

[15] 3,660,913
[45] May 9, 1972

[54] METHOD AND APPARATUS FOR TEACHING MATHEMATICS IN DIFFERENT NUMBER SYSTEMS

[72] Inventor: James L. Heath, 1500 Northwest 13th Street, Corvallis, Oreg. 97330

[22] Filed: June 1, 1970

[21] Appl. No.: 41,846

[52] U.S. Cl. ................................................ 35/30, 235/155
[51] Int. Cl. ...................................................... G09b 19/02
[58] Field of Search ........................... 35/30, 31 R, 31 C, 32; 235/155, 169, 92 CV, 92 VA, 92 BN, 92 BD, 92 BQ

[56] References Cited

UNITED STATES PATENTS

| | | | |
|---|---|---|---|
| 3,064,894 | 11/1962 | Campbell | 235/155 |
| 3,162,960 | 12/1964 | Elmlinger | 35/30 |
| 3,462,854 | 8/1969 | Schwartz | 35/32 |
| 3,414,985 | 12/1968 | Ashley | 35/8 R |
| 3,245,156 | 4/1966 | De Bloois et al. | 35/8 R |

*Primary Examiner*—Wm. H. Grieb
*Attorney*—Buckhorn, Blore, Klarquist and Sparkman

[57] ABSTRACT

A method and apparatus for teaching relationships between the calculations in different number bases using a simple computer unit. The unit has a manually operable decimal input dial, manually operable binary input switches, an electrical counting circuit activated by the manual input devices, binary output indicators including a series of indicator lamps corresponding to the capacity of the counting circuit, but no memory. Interchangeable indicia strips can be placed in conjunction with the indicator lamps with indicia expressing the binary output in terms of its decimal, exponential or other equivalent. Remote dial input and large display light attachments facilitate classroom instruction. A modification of the unit has a built-in tape cassette playback component including speaker and controls for playing instructional tapes as the student learns to use the machine.

13 Claims, 10 Drawing Figures

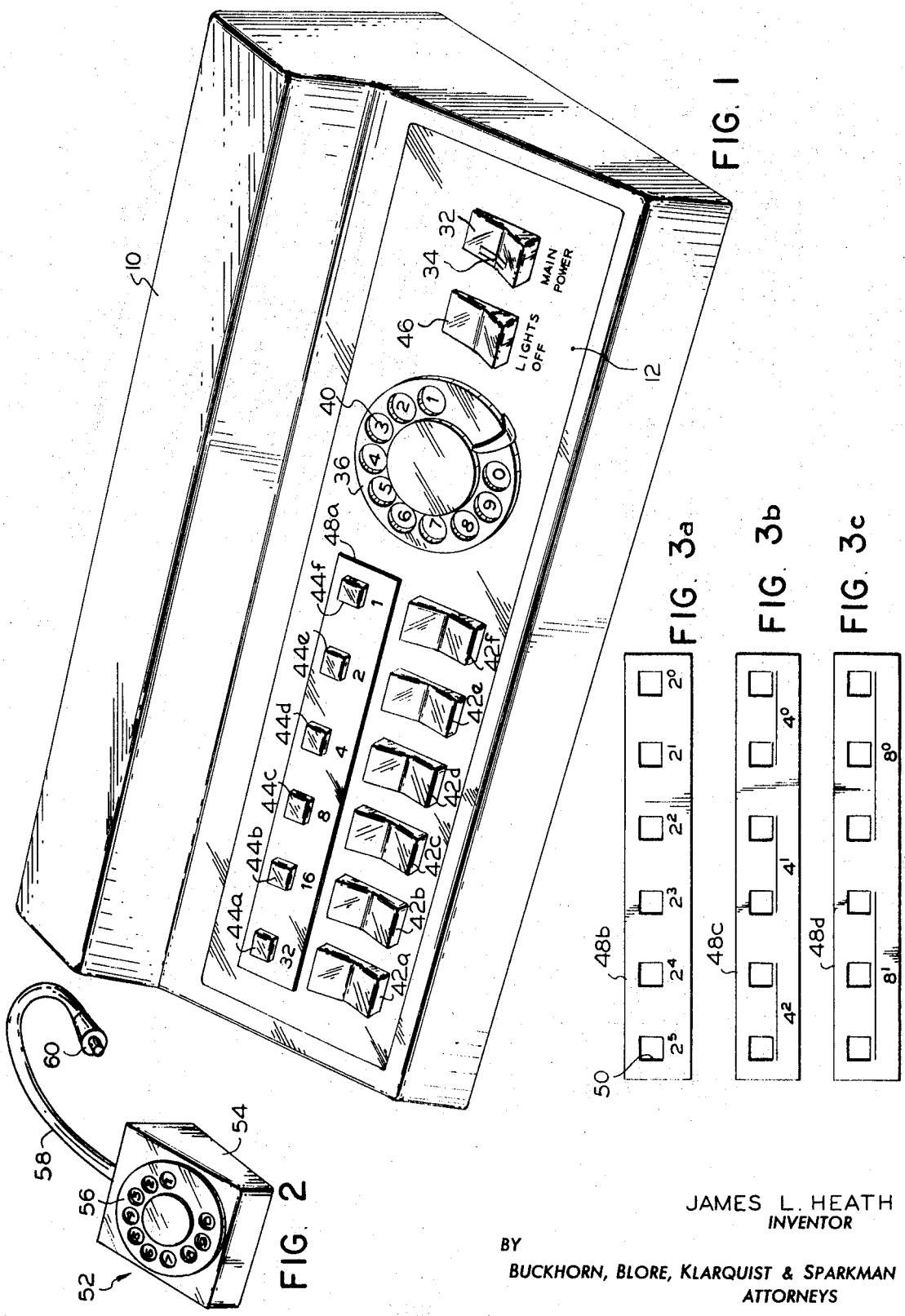

JAMES L. HEATH
INVENTOR

BY

BUCKHORN, BLORE, KLARQUIST & SPARKMAN
ATTORNEYS

METHOD AND APPARATUS FOR TEACHING MATHEMATICS IN DIFFERENT NUMBER SYSTEMS

BACKGROUND OF THE INVENTION

1. Field of the Invention

The present invention relates to the teaching of mathematics, and more particularly to a method and apparatus for teaching mathematical concepts and relationships in different number systems and the relationships between such systems.

2. Description of the Prior Art

Numerous mechanically and electrically operated devices have been suggested heretofore for teaching students how to calculate in different number systems. However, prior devices of this sort require the user to work in only a single number base, for example, by providing a binary input so that the device will perform a binary calculation and provide a binary output. Such prior devices do not help a student learn the relationship between different number systems. For example, no known prior device enable a student to work with input or problems expressed in a familiar number base, for example the base 10, but with outputs or answers expressed in a different, perhaps unfamiliar number base, with means for helping the student express the output in either number base.

Moreover, no known device of the aforementioned type is adaptable for use in both large classroom situations and individual student practice and self-teaching situations.

With the widespread adoption of the computer in education, business and industry, and the consequential introduction of the "new math" in our school systems, there is a great need for a tool which will help both teachers and students understand mathematical concepts underlying the new math and computer technology.

SUMMARY OF THE INVENTION

In accordance with the present invention, the deficiencies of the prior art are overcome by providing a method and apparatus whereby a student can express a number or problem in terms of a known number base, input the number or problem in the known number base into a computer and have the computer provide a visual output expressed in a different number base so that a student, using his mental processes, can compare relationships between different number bases.

In another aspect of the invention, the operator has a choice of working with a decimal or binary input, in either case with the computer rendering a binary output.

Another feature of the invention is the provision of multiple interchangeable indicia strips used in conjunction with the binary output indicators to enable the user to work with number systems other than the binary and decimal systems.

In a further aspect of the invention, the input is discernible to the tactile, visual and auditory senses of the user, thereby enhancing the learning process.

Another feature of the invention includes a remote input device which can be connected to the basic computer unit so that the basic unit can be placed in a readily observable position at the front of a classroom while various students input problems into the computer using the remote input attachment.

Still another feature of the invention is a large light display attachment which can be used in large classroom situations as an overhead display output unit readily observable by all students while individual students manipulate the input devices of the computer.

In another aspect of the invention, two or more individual computer units can be connected in series to multiply the capacities of the individual units.

In still another aspect of the invention, a cassette tape playback component is incorporated in the basic computer unit for playing instructional tapes on the use of the machine thereby facilitating the learning process.

Primary objects of the invention are to provide a method and apparatus which:

1. help the student develop a clear understanding of various mathematical concepts including sets, numeration, addition, subtraction, multiplication and division;
2. help the student to apply various mathematical concepts in different number systems;
3. help the student learn mathematical concepts in a way that is interesting and fun;
4. help the student learn mathematical concepts rapidly;
5. help the student gain a working knowledge of different number systems, the relationship between different number systems, and the ability to calculate in different number systems;
6. help the student understand the operation of a simple computer;
7. help very young students learn basic mathematical concepts; and
8. enable students to set up and compare mathematical expressions, problems and solutions in different number bases.

The foregoing and other objects, features and advantages of the invention will become more apparent from the following detailed description which proceeds with reference to the accompanying drawings wherein:

FIG. 1 is a front perspective view of a computer in accordance with the invention;

FIG. 2 is a remote dial input extension attachment for use with the apparatus of FIG. 1;

FIGS. 3a, 3b and 3c are front views of output indicia strips for use in conjunction with the apparatus of FIG. 1;

DETAILED DESCRIPTION

GENERAL ASSEMBLY

With reference to the drawings, FIG. 1 shows the basic computer unit in accordance with the invention including a housing 10 which may be made of a molded plastic or any other suitable material having the necessary strength, rigidity and durability. The housing may be given an attractive coloration to appeal to young students. A front face of the housing includes a control panel 12.

Figure 5:
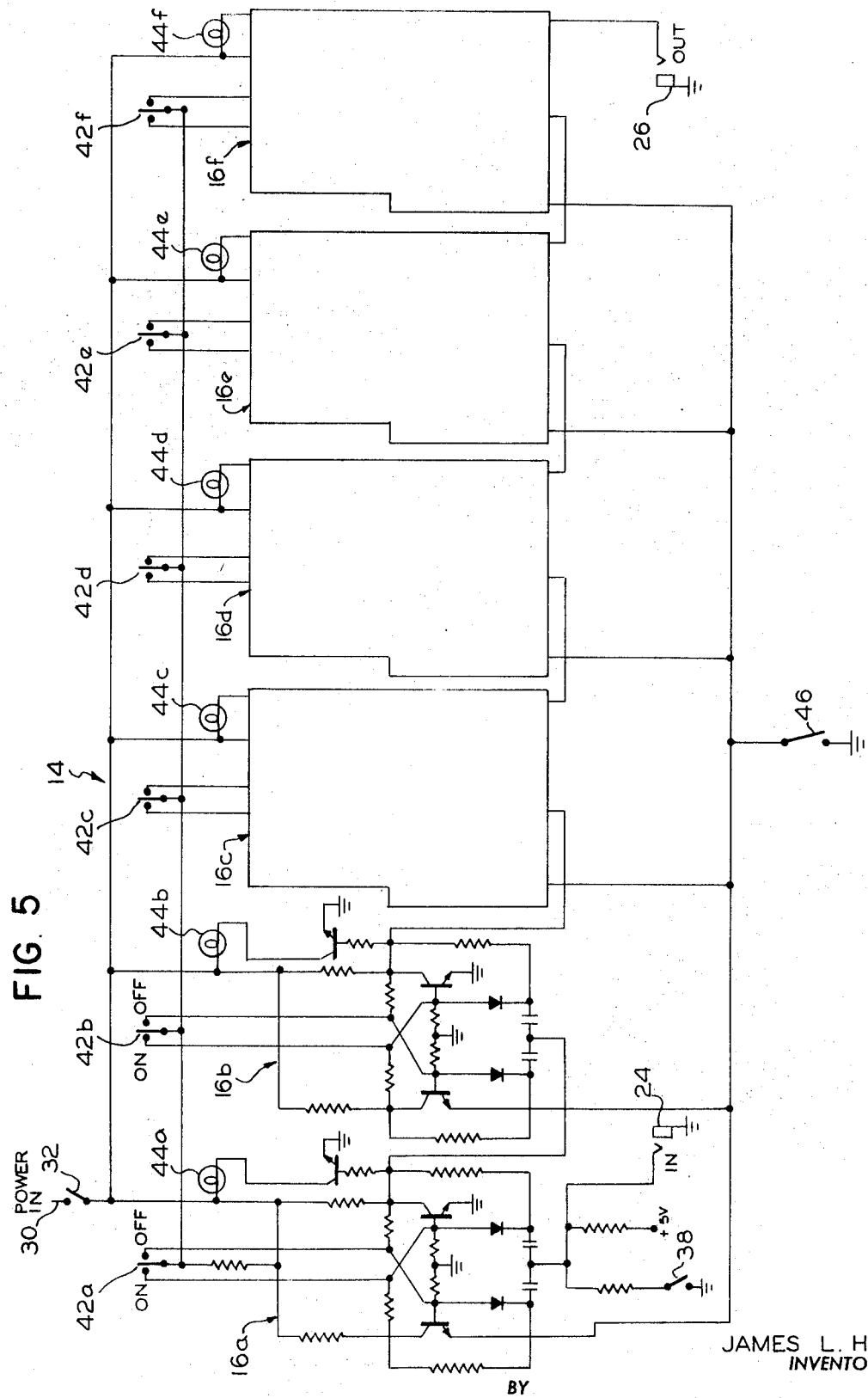
FIG. 5 is a circuit diagram of the counting circuit within the apparatus of FIG. 1.

An electrical counting circuit means 14, shown in FIG. 5, is installed within housing 10 and may be incorporated in a printed circuit board (not shown). The counting circuit comprises a series of six bistable multivibrator circuits, or so-called flip-flop circuits, 16a, 16b, 16c, 16d, 16e, 16f, connected in the manner shown in FIG. 5.

Figure 4:
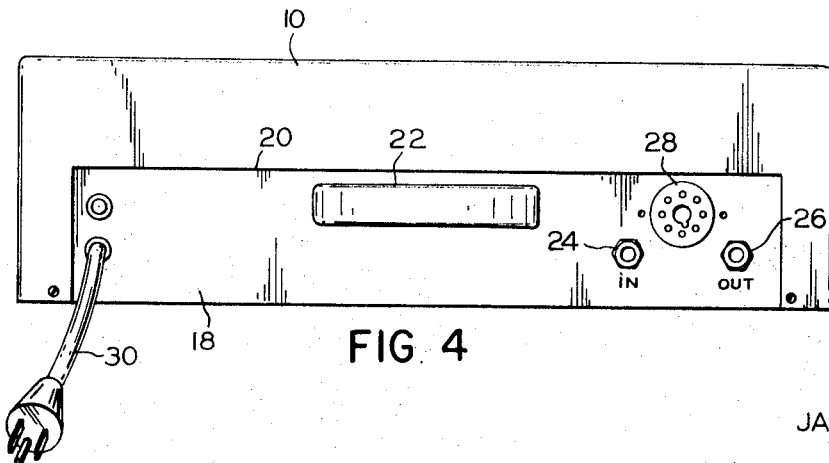
FIG. 4 is a back view of the apparatus of FIG. 1 on a reduced scale.

The electrical circuitry is mounted on a rigid metal or other suitable base member 18, shown in FIG. 4, forming the bottom and a portion of the back of the unit and meeting the molded plastic housing 10 along the parting line 20. The outer face of the back portion of base 18 mounts a carrying handle 22, an input jack 24, an output jack 26, and an eight-prong electrical receptacle 28. A power cord 30 extends through the back of base 18. The foregoing electrical components are also shown in the circuit diagram of FIG. 5.

CONTROL PANEL

Referring to FIGS. 1 and 5, control panel 12 includes a main power switch 32 which, when turned to its "on" position, illuminates a light 34 visible through the switch button. A manually operable decimal input dial 36 enables the user to input any decimal number as indicated into the binary counting circuit. The mechanical decimal input represented by dial 36 is converted by the counting circuit means to an electrical binary input signal at switch 38. The dial with its visible indicia 40 expressed in the decimal number system enables the operator to discern the size of the number being input into the computer circuit through his tactile, visual and auditory senses.

There is also a manually operated binary input represented by the six three-position switches 42a, 42b, 42c, 42d, 42e, 42f. Each such input switch 42 is biased to its intermediate "off" position and the operator, by depressing momentarily the upper or lower half of one of such buttons, sends a single input signal to the counting circuit corresponding to the selected button. The counting circuit includes binary output means recordable at six visible binary output indicators comprising the six lamps 44a, 44b, 44c, 44d, 44e, 44f visible on the control panel in positions corresponding to the six binary input switches.

The counting circuit and control panel also includes a two-position clearing switch 46 which is normally biased to its open position but which, when pressed closed momentarily, clears the total indicated by the illuminated binary output indicator lights 44 by turning off such lights.

INDICATOR STRIPS

Referring to FIG. 1 and FIGS. 3a, 3b and 3c, a series of interchangeable indicia means in the form of indicator strips 48a, 48b, 48c, 48d are provided for use in conjunction with the output indicator lamps 44. Each strip is made of a transparent plastic material and has a series of six square openings 50 therethrough sized and spaced to fit over the square covers of indicator lamps 44. The decimal or exponential expression for each binary output lamp is printed on each strip beneath the appropriate opening or series of openings corresponding to the lamps representing such expression. For example, strip 48a has the decimal equivalent of each binary output lamp printed beneath the appropriate opening. Thus if lamp 44f is illuminated, indicator strip 48a will indicate that the total of the binary output expressed in the base 10 is 1. Similarly, if lamp 44e is illuminated, this indicates that the decimal equivalent of the binary output is 2, expressed in the base 10, and so forth.

Indicator strip 48b is designed to give the exponential expressions for the various binary outputs expressed in the base 2. Strip 48c is designed to express the exponential expressions of the various outputs in the base 4. Strip 48d is designed to give the exponential expressions of the output lamps in the base 8. Thus the indicator strips enable a beginning user of the machine to learn to work mathematical concepts in several different number systems, thereby enhancing the learning process.

REMOTE INPUT

FIG. 2 shows a dial input extension attachment 52 for the unit of FIG. 1. Such attachment includes a base 54 housing the necessary electrical switch device for converting the manually operated decimal input of a dial 56 to an electrical binary signal for transmission to the input side of the counting circuit in the main unit. Dial 56 is a duplicate of the primary decimal input dial 36. The input signal from the remote dial input is transmitted through a power cord 58 which includes a male connector jack 60 designed to fit within the input jack 24 on the back of the main unit. The remote dial input extension is designed to enable various students in a classroom to dial inputs into the main computer unit from remote points in the classroom while the unit is at the front of the class where all may observe the resulting output.

LARGE LIGHT OUTPUT DISPLAY

Figure 7:
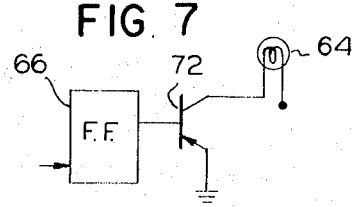
FIG. 7 is a circuit diagram of a typical circuit used within the attachment of FIG. 6.
Figure 6:
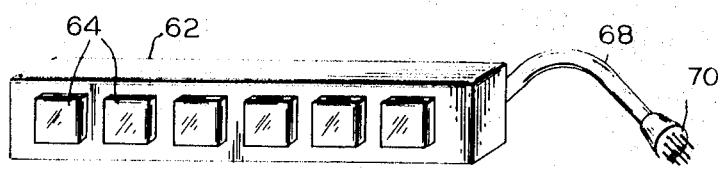
FIG. 6 is a front perspective view of an overhead light display attachment for use with the apparatus of FIG. 1.

A large light display attachment 62 for use with the unit of FIG. 1 is shown in FIG. 6. The display unit includes a series of six lamps 64 corresponding to the output lamps on the basic unit. Remote display unit 62 carries its own series of flip-flop circuits 66, one of which is shown schematically in FIG. 7 for illuminating the lamps 64 of the display unit. A power cord 68 with eight-prong plug 70 is designed to fit within receptacle 28 on the back of the main unit. The main unit provides the output signals necessary to energize the flip-flop circuits in the remote display unit. Thus the output of each flip-flop circuit in the main unit is channeled through cord 68 to a corresponding flip-flop in the remote light display unit. A power transistor 72 in conjunction with each remote flip-flop circuit energizes each display light 64.

The remote large light display unit is designed for use in large group instructional situations. For example, it might be desirable for the instructor or a student to manipulate the input devices on the main unit or on a remote input dial extension as shown in FIG. 2, with the resultant output being visible to a large number of people at a great distance from the display unit.

FIG. 8 MODIFICATION

Figure 8:
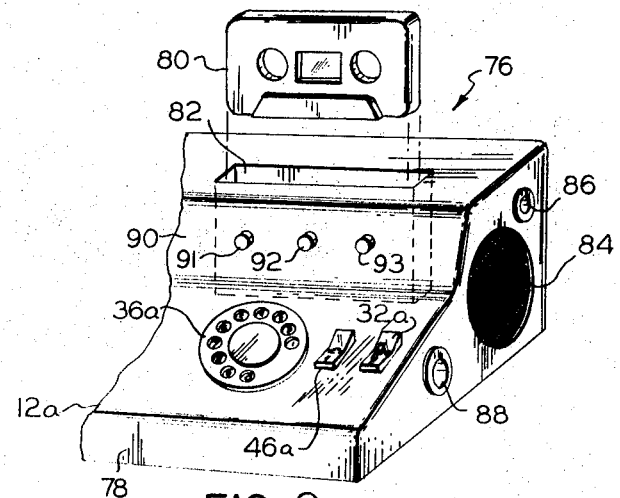
FIG. 8 is a partial front perspective view of a modified form of the apparatus incorporating an instructional tape playback component.

A modified form of the invention is shown in FIG. 8. In this modification a tape reader or playback component indicated generally at 76 is incorporated in the basic computer unit similar to the unit of FIG. 1. That is, the unit of FIG. 8 has a housing similar to that of FIG. 1 but of a size sufficient to incorporate the additional tape playback component. The purpose of the tape playback component is to allow instructional tapes on the use of the computer to be played by the student as he learns how to use the unit, either in a classroom situation or in the absence of a teacher. This feature also assists students who have difficulty reading or following written instructions.

The playback unit is of the type adapted to receive a standard commercial two-track tape cassette 80 within an opening 82 in housing 78. An amplifier (not shown) is built into the unit to increase the power of the reader signal to drive a built-in speaker 84 or a remote earphone connected to the basic unit at an earphone jack 86. The audio signal is, of course, carried on one track of the two-track tape provided in the tape cassette.

The second track of the two-track tape is used to allow the computer to control the display of a 35 mm. slide projector through a slide projector adapter socket 88. This feature allows audio instructions to control visual examples of problems projected from a slide projector that the student will then work out on the computer. Problems can be presented and then student responses reinforced with these audio and visual features.

The inclined front face portion 90 of the basic unit carries tape controls including an on-off-volume control 91, a play/stop control 92 and a rewind control 93.

Housing 78 also has a control panel 12a carrying the same controls as provided in the control panel 12 of the unit shown in FIG. 1, including a decimal input dial 36a, clearing switch 46a and main power switch 32a.

OPERATION

The operation of the computer of FIG. 1 and a suggested program for teaching mathematical concepts using such computer are contained in a publication entitled "Educomp Mathematics," published in 1969 by Educomp, Inc., of Corvallis, Oregon, and authored by the applicant and Gary Tressel.

PREPARATION FOR USE

The computer is turned on by plugging in power cord 70 to an electrical outlet and pressing down on the upper portion of main power switch 32, causing light 34 beneath the switch button to illuminate. To turn the computer off, the lower portion of the same switch 32 is pressed down.

If it is desired to work in the binary or base 2 system, the indicia strip 48a containing the numbers 1, 2, 4, 8, 16, 32 can be slipped over the indicator light cases on the control panel as shown in FIG. 1 to help the student interpret the binary output of the computer in terms of the decimal system or base 10. Alternatively, the student could use the indicia strip 48b marked $2^0, 2^1, 2^2, 2^3, 2^4, 2^5$ if working in the base 2 to help interpret the output in terms of its exponential equivalent. Similarly, if the student wishes to work in the base 4, he can use the indicia strip marked $4^0, 4^1, 4^2$ in the same manner. If working in the base 8, the student can use the indicia strip marked $8^0, 8^1$ as an aid to interpreting the value of the lights in such base.

USE OF INPUT DIAL

Assuming that the student is working in the base 2 and the indicia strip 48a is over the output lights as shown in FIG. 1, the student may enter any decimal number into the computer by dialing such number as indicated on the dial. For example, by dialing the number 1 into the computer, the first light 44f to the left of the dial illuminates since such light represents the decimal number 1 in the binary system. If the decimal number 2 is dialed into the computer, the second light 44e to the left of the dial illuminates since that single light represents the decimal number 2 in the binary system. If the decimal number 3 is dialed into the computer, both lights 44f and 44e go on because such two lights, representing the numbers 2 and 1, added together equal 3. If the number 4 is dialed into the computer, only the third light 44d illuminates, since that light represents the decimal number 4 in the binary system. Similarly, if the number 5 is dialed into the computer, the first and third lights illuminate. If the number 6 is dialed into the computer, the second and third lights illuminate. If the number 7 is dialed into the computer, the first three lights illuminate, representing the decimal number 7 in the binary system. If the number 8 is dialed into the computer, only the fourth light 44c goes on. If the number 9 is dialed into the computer, the first and fourth lights illuminate since the decimal value of such lights together totals 9. If the number 10 is dialed into the computer, the second and fourth lights illuminate.

The foregoing assumes that after each number is dialed into the computer the "lights off" or clearing switch 46 is pressed to clear or extinguish preceding input and indicator lights. If this is not done, two consecutive numbers dialed into the computer are added together by the counting circuit and the sum of these numbers is indicated on the output indicator lights.

Thus to dial a number into the computer greater than the number 10, any combination of numbers indicated on the dial totalling the desired number can be dialed in to have the indicator lights represent such number. For example, the number 11 can be dialed into the computer by dialing in the number 10 and the number 1 consecutively without pressing the clearing switch, causing the first, second and fourth lights 44f, 44e and 44c to light up. Alternatively, the number 11 can be dialed into the computer by dialing in the numbers 6 and 5, with the same result shown on the output lights.

Similarly the number 23 can be dialed into the computer by dialing in the number 10 twice and the number 3 once without clearing the lights between dialings. This would result in the first, second, and fifth lights to the left of the dial illuminating.

If the number 63 is dialed into the computer, all six lights would illuminate. The decimal number 63 thus represents the capacity of the illustrated computer when working in the base 2. However, the capacity can be multiplied, if desired, by connecting together two such computers with a connector cable leading from the output jack of one to the input jack of the other.

USE OF INPUT SWITCHES

Numbers can also be put into the computer using the input switches 42 below the lights. The switch below each light represents the same number value as the light itself. For example, to put the decimal number 1 into the computer, the first switch 42f to the left of the dial is pressed down momentarily; to enter the number 2 into the computer, the second switch would be pressed once momentarily; and to enter the number 3, the first two switches would be pressed consecutively without clearing between presses. To enter the number 4, the third switch is pressed; to enter the number 8, the fourth switch is pressed; to enter the number 16, the fifth switch is pressed; and to enter the number 32, the sixth switch is pressed.

Any number can be put into the computer by pressing any combination of the switches that will give that number. For example, the number 8 can be put into the computer either by pressing the fourth switch to the left of the dial once, or by pressing the third switch twice, or by pressing the second switch four times, without clearing the lights between presses.

Each input switch has a normally centered or neutral position. A number is entered into the computer either by pressing down on the upper part of the switch if the light above the switch is off, or by pressing down on the lower part of the switch if the light above the switch is already on. Thus to enter the number 34 into the computer via the switches assuming no lights are on, the upper part of the fifth switch 44b can be pressed down and released, then the lower part of the same switch is pressed down and released without clearing the lights between presses, then the second switch 44e is pressed. The second and sixth lights should now be on, representing the decimal number 34 in the binary system.

Using the foregoing procedures, the student can be readily taught to express base 10 numbers in the base 2 or binary system and base 2 numbers in the base 10, using the computer indicator lights and indicator strip 48a as guides. For example, the student learns that the decimal number 10 is expressed in the base 2 as 001010, by placing a 1 in positions corresponding to the illuminated computer lights and by placing a 0 in the positions corresponding to the indicator lights that are out. He also soon learns that the same binary expression for the decimal number 10 can be shortened to 1010.

NUMBER SETS

The computer can also be used to help teach the theory of number sets. For example, the student observes that by pressing the top of the second input switch 44e once, he puts a first set of 2 into the computer and the second light illuminates. Then by pressing the bottom of the second switch, he puts a second set of 2 into the computer, and the third light illuminates, indicating that two sets of the number 2 equals 4. Then by putting a third set of 2 into the computer, he learns that three sets of 2 equals 6 by observing that the second and third lights are on. He also learns that three sets of 2 are expressed in the binary system as 110 as shown by the computer indicator lights or as 6 in the decimal system by noting the decimal equivalents of the lights on the strip 48a.

ADDITION

By now it is apparent that the computer adds numbers together that are put into the computer when the indicator lights are not cleared between inputs. Thus the student readily learns to add using the computer and to express the result either in the decimal or the binary system. For example, the student can add the numbers 7, 2 and 5 and find their sum by dialing such numbers consecutively into the computer without clearing the lights between dialings. When he does this, he notices that the second, third and fourth indicator lights are illuminated, representing a total of 14, or, expressed in the base 2, 1110. Thus he soon learns to convert readily between decimal and binary expressions of a given number.

MULTIPLICATION

By using the computer the student learns that multiplication is actually multiple addition. For example, he learns that 3 × 4 can be expressed as three sets of 4 or four sets of 3. He learns to find the solution either by (1) pressing the third switch representing the number 4 three times to enter three sets of 4 into the computer, or by (2) dialing three sets of 4 into the computer and then reading the solution either in the binary system as 1100, or in the decimal system as 12. Alternatively he can put four sets of 3 into the computer using either the switches or dials in the same manner.

SUBTRACTION

The student also learns to subtract directly using the computer and the theory of complements. For example, to find the solution to the subtraction problem 9 − 5, the student proceeds as follows:
1. First he dials or pressed 9 into the computer and notices which lights are illuminated and which lights remain off;
2. Now he clears the lights to extinguish the first and fourth lights that were illuminated;
3. He turns on the second, third, fifth and sixth lights that were off by pressing the corresponding switches;
4. Now he dials 5 into the computer;
5. Now he clears the first, second, fourth, fifth and sixth lights that are on and turns on the third light which was off by pressing the third switch. This light represents the solution to the problem, being the number 4.

DIVISION

Once the student masters subtraction using the computer, he can readily go on to learn division. Just as multiplication can be considered multiple addition, he finds that division can be considered multiple subtraction. For example, the solution to a division problem can be found on the computer as follows, assuming the problem is 27 divided by 8:
1. First dial or press the number 27 into the computer and observe that the first, second, fourth and fifth lights only are illuminated;
2. Now clear the lights;
3. Illuminate the third and sixth lights that were out by pressing the appropriate switches;
4. Now dial or press the divisor number 8 into the computer;
5. Dial again the number 8 into the computer a second time;
6. Now dial the number 8 into the computer a third time and notice that the third, fourth, fifth and sixth lights are on, but the first and second lights are off. Since the lights that are now off represent the number 3, which is lower than the divisor 8, this means that the divisor 8 cannot go into the number 27 any more times. Since the number 8 has been put into the computer three times and the total of the lights that are off is 3, the answer to the problem 27 8 is 3 with a remainder of 3.

The foregoing procedure is known as division with complements.

Learning the foregoing and other mathematical concepts can be greatly facilitated using a computer as described. Moreover, the student will find that learning such concepts is much more interesting and fun when the computer is used as a tool in the process. The student soon learns to work in different number bases and to convert from one number base to another with ease.

The computer as described is simple and inexpensive to manufacture, light in weight, easily transportable, virtually maintenance-free and usable either in large classroom situations or by students working alone.

A student is capable of teaching himself the various mathematical concepts when the computer is used in conjunction with the aforementioned "Educomp Mathematics" arithmetic workbook, the tape playback unit, or both.

Having described what is presently a preferred embodiment of my invention, it should be apparent to those skilled in the art that the same permits of modification in arrangement and detail. I claim as my invention all such modifications as come within the true spirit and scope of the following claims.

I claim:

1. Apparatus for teaching mathematics in different number bases comprising:
   manually operable mechanical input means in a decimal number base,
   electrical counting circuit means, including a series of interconnected individual counting circuits, and a clearing switch for clearing said circuits,
   means for converting said mechanical input means to an electrical input means for input to said electrical counting circuit means,
   said counting circuit means having output means including a visual output totalling means expressed in a binary number base,
   said visual output totalling means including a series of lamps corresponding in number to the number of individual counting circuits embodying said counting circuit means,
   manually operable mechanical input means in a binary number base and means for converting said mechanical input means in said binary number base to an electrical input means in said binary base to said counting circuit means,
   said mechanical input means in said binary and decimal number bases embodying indicia means discernible to the visual, auditory and tactile senses of the operator activating said input means.

2. Apparatus according to claim 1 wherein said decimal mechanical input means comprises a rotary dial switch means having visible, audible and tactile indicia of input.

3. Apparatus according to claim 1 wherein said apparatus is embodied in a portable, desk-top-sized housing unit and said mechanical and electrical input means include a separable input extension means selectively attachable to said apparatus by a flexible electrical conduit means for effecting an input from a point remote from said unit.

4. Apparatus according to claim 1 including interchangeable indicia strip means operable and attachable in association with and selectively detachable from association with said lamps, each said indicia means including means translating the visual output represented by said lamps in said binary number base to an equivalent expression in another number system.

5. Apparatus according to claim 1 including a portable desk-top-sized housing unit embodying the various said means, said counting circuit means including input and output connector means connected in said circuit means in a manner so that said input connector means of one said housing unit can be connected to said output connector means of another said housing unit so as to connect said counting circuit means of one said unit in series with said counting circuit means of another said unit, thereby to multiply the calculating capacity of said units.

6. Apparatus according to claim 1 wherein said apparatus is embodied in a first desk-top-sized housing unit including electrical receptacle means connected to the output side of each individual counting circuit embodying said counting circuit means, said visual output means including a second unit separated from said first unit and embodying large display lamp indicia in said binary number base for large group instruction.

7. Apparatus according to claim 6 wherein said second unit includes a series of individual counting circuits corresponding in number to the individual counting circuits of said first unit, and flexible electrical conductor means including an electrical connector means for mating connection with said receptacle means to interconnect the outputs of said individual circuits of said first unit with the individual circuits of said second unit.

8. Apparatus according to claim 1 wherein said apparatus is embodied in a housing unit, said unit embodying a tape playback means including a speaker means and control means for transmitting taped audible instructions to a user of said apparatus.

9. Apparatus according to claim 1 including a portable desk-top-sized housing containing said counting circuit means,
   said housing defining a front face,
   said decimal input means comprising a rotary telephone dial-type switch with said dial positioned on said front face, said binary input means comprising a series of three-position switches aligned on said front face and corresponding in number to the number of individual counting circuits, each said three-position switch being electrically connected to a different one of said counting circuits and having a first neutral position, a second position connecting the switch to one side of its associated circuit, and a third position connecting the switch to the opposite side of its associated circuit, said lamps including visible portions on said face and arranged each in association with a different one of said three-position switches, each said lamp and associated said three-position switch being electrically connected to the same one of said counting circuits so that each associated three-position switch and lamp represent the same binary expression.

10. Apparatus according to claim 9 including a series of indicia strips each representative of a different number system, each said strip having a series of openings therethrough corresponding in number to the number of said lamps and arranged so that said strips can be selectively placed over said lamps with said lamps extending through said openings and thereby retaining said strips on said face.

11. A teaching device for teaching calculation in different number bases and for enabling the comparison of calculations in an unfamiliar base with the same calculations in a familiar number base, said device comprising:

a portable desk-top-sized housing having a front face, electrical binary counting circuit means comprising a series of series-connected bistable multivibrator counting circuits each representative of a different binary number, decimal input means comprising a manually operable ten-position rotary telephone dial-type switch with automatic return and having decimal indicia on the dial face positions, said rotary dial including said dial face being on said housing face, and said rotary switch being operable to transmit a number of electrical pulses corresponding to the decimal number dialed and an audible signal of a length corresponding to the decimal number dialed, an electrical lead leading directly from said dial switch to a first one of said series of counting circuits corresponding to the lowest binary number represented by said circuits, for transmitting said decimal dial pulses into said first circuit, binary input means comprising a series of manually operable, three-position input switches on said housing face corresponding in number to the number of said counting circuits, three-position said three- switch having a normally open position and two closed positions including a first closed position for transmitting a single electrical pulse at a time through a first lead to one side of its corresponding counting circuit and a second closed position for transmitting a single electrical pulse at a time through a second lead to the opposite side of the same said corresponding counting circuit so that when said first and second positions of said three-position switch are closed alternately, the associated counting circuit is operated in additive fashion, and a series of electrical lamps corresponding in number to the number of counting circuits and three-position input switches, said lamps being arranged on said housing face, each in association with one of said three-position switches, each said lamp being electrically connected to the output side of a different one of said counting circuits with each lamp and its associated said three-position switch being electrically connected to the same said counting circuit so that each lamp and three-position switch represents the same binary expression, and normally open clearing switch means operable on the outside of said housing and electrically connected in said counting circuit means in a manner to clear all of said multivibrator counting circuits and multivibrator associated output lamps when closed.

12. An apparatus for teaching mathematics in different number bases comprising:

manually operable decimal input means providing visual, tactile and audible indications of a decimal input, manually operable binary input means providing visual, tactile and audible indications of a binary input, an electrical binary counting circuit means for receiving input signals from said decimal and binary input means including means for converting decimal inputs to binary inputs, and clearing switch means for clearing said counting circuit means, a visual binary output means comprising a series of indicator lamps for receiving output signals from said counting circuit means, and multiple interchangeable indicia strip means for use in association with said indicator lamps for translating said binary output as indicated by said lamps to a decimal or other equivalent thereof, said apparatus being housed in a portable desk-top-sized housing, with said manual decimal and binary input means and said lamps being provided on a front face of said housing.

13. A method of teaching mathematical concepts and relationships and calculations in different number systems comprising:

feeding visually, audibly and tactilely discernible decimal or binary inputs into an automatic electrical binary counter, converting each said decimal input to its binary equivalent and adding electrically said converted input to previous binary or converted decimal inputs using said binary counter to obtain a binary output from said counter, transmitting said binary output to visually discernible binary output indicator lamps, then comparing the result expressed by said lamps in the binary number system with the same result expressed in the decimal number system.

* * * * *

UNITED STATES PATENT OFFICE
CERTIFICATE OF CORRECTION

Patent No. 3,660,913            Dated May 9, 1972

Inventor(s) JAMES L. HEATH

It is certified that error appears in the above-identified patent and that said Letters Patent are hereby corrected as shown below:

Column 1, line 20, "enable" should be --enables--;

Column 7, line 11, "pressed" should be --presses--;
Column 7, line 47, "27 8" should be --27 ≠ 8--;
Column 9, line 50, claim 11, "three-position said three-" should be --each said three-position--;
Column 10, line 19, claim 11, "multivibrator" (second occurrence) should be --their--.

Signed and sealed this 6th day of March 1973.

(SEAL)
Attest:

EDWARD M. FLETCHER, JR.          ROBERT GOTTSCHALK
Attesting Officer                 Commissioner of Patents